United States Patent [19]
King et al.

[11] Patent Number: 5,358,106
[45] Date of Patent: Oct. 25, 1994

[54] GARMENT BAG WITH OVERLAPPING CLOSURE FLAPS

[75] Inventors: Heather R. King, 4705 Annaway Dr., Edina, Minn. 55436; Elaine R. Warton, Waukegan, Ill.; Max Ware, Newport Beach, Calif.

[73] Assignee: Heather R. King, Edina, Minn.

[21] Appl. No.: 93,466

[22] Filed: Jul. 19, 1993

[51] Int. Cl.⁵ .............................. B65D 85/18
[52] U.S. Cl. ............................ 206/278; 206/287
[58] Field of Search ............. 206/278, 287, 287.1, 206/279; 229/87.15, 87.17

[56] References Cited

U.S. PATENT DOCUMENTS

| | | | |
|---|---|---|---|
| 1,070,790 | 8/1913 | Falk | 206/287 X |
| 1,200,030 | 10/1916 | Rottman | 206/287 X |
| 1,461,049 | 7/1923 | Rottman | 206/278 X |
| 1,498,811 | 6/1924 | Rottman | 206/278 |
| 1,968,102 | 7/1934 | Stone | 206/287 |
| 2,547,530 | 4/1951 | Mehl | 206/287 |
| 2,590,462 | 3/1952 | Rassenfoss | 206/287 |
| 3,007,567 | 11/1961 | Rosen | 206/287 |
| 3,670,947 | 6/1972 | Tangredi et al. | 206/278 |
| 3,999,656 | 12/1976 | Hydorn | 206/287 X |
| 4,084,689 | 4/1978 | Yamagata | 206/287 X |

FOREIGN PATENT DOCUMENTS

| | | | |
|---|---|---|---|
| 1039181 | 5/1953 | France | 206/287 |
| 811511 | 4/1959 | United Kingdom | 206/287 |
| 2249296 | 5/1992 | United Kingdom | 206/287 |

Primary Examiner—Sue A. Weaver

[57] ABSTRACT

An inexpensive plastic garment bag, particularly adapted for gift-wrapping and garment storage, and providing a reusable closure flap system for closing the bottom of the bag.

4 Claims, 1 Drawing Sheet

GARMENT BAG WITH OVERLAPPING CLOSURE FLAPS

BACKGROUND OF THE INVENTION

In the past, garment bags have usually been constructed for covering garments for travel or for home storage. These bags are of relatively expensive construction and are frequently provided with a zipper type closing mechanism and usually have either a permanently closed and sealed bottom edge. Another type of bag, such as that used as a protective covering by dry cleaners, is completely open at the bottom and is too flimsy in its construction to provide a good reusable protective covering such as is provided by the present garment bag construction.

The reusable bags presently available are relatively expensive and therefore are not readily adapted for use as a gift wrapper bag which is lightweight and relatively inexpensive to manufacture and which provides a sealed bottom closure.

SUMMARY OF THE INVENTION

The present invention constitutes a highly efficient, decorative and reusable protective wrapper for garments which are being packaged as gifts or are being covered for storage.

The bag is provided with a pair of reinforced overlapped bottom closure flaps which will produce a relatively stable bag bottom. Reusable pressure-sensitive adhesive closure strips are provided for releasably connecting the bottom flaps for closing the bottom of the bag, but permitting the bottom seal to be easily opened for access to the contents.

DETAILED DESCRIPTION OF THE DRAWINGS

Figure 2:
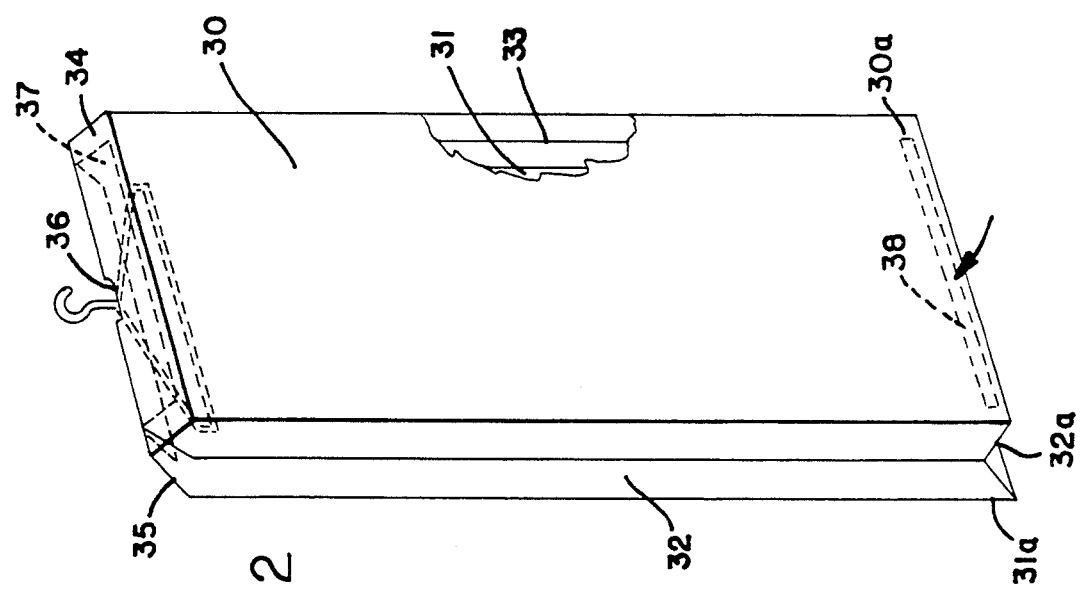
Figure 1:
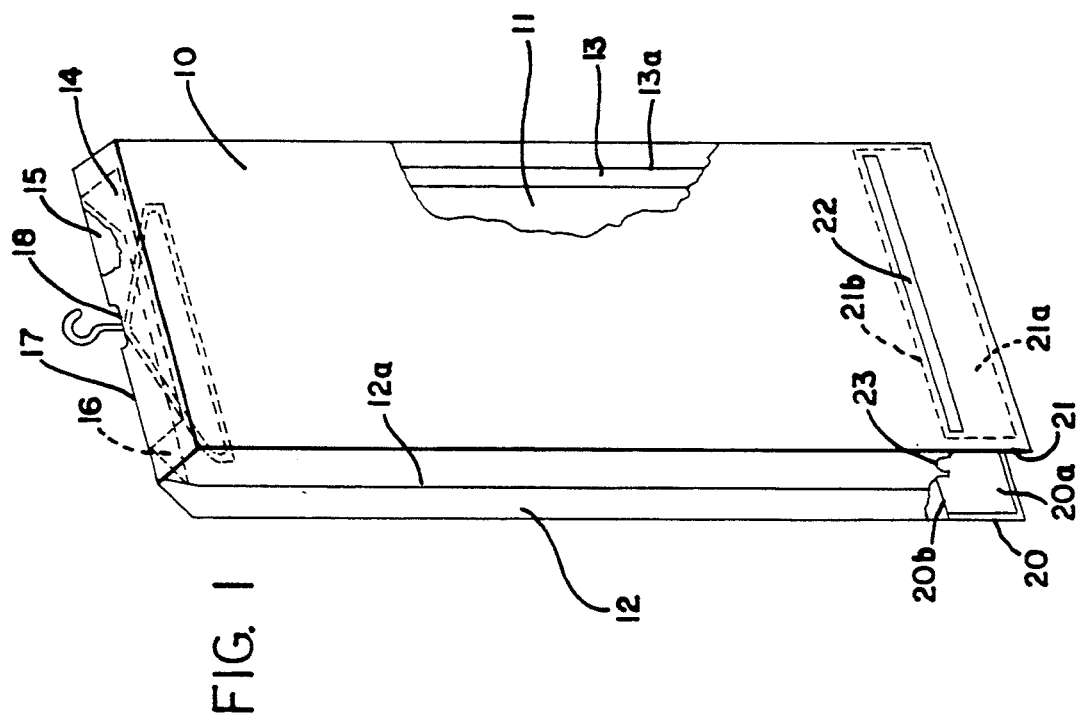

FIG. 1 is a perspective view showing a garment bag embodying one form of the present invention; and, FIG. 2 is a perspective view showing an alternative form of the invention.

DESCRIPTION OF THE PREFERRED EMBODIMENT

This invention provides an inexpensive reusable and decorative bag enclosure for garments. It is capable of use for transporting gift garments from place of purchase to destination, as well as for wrapping gift garments. It provides enclosure featuring a readily-accessible reclosable bottom flap construction. The bottom closure flaps are reinforced and can be positively held in closed position by suitable releasable pressure-sensitive adhesive.

The blown film extrusion process, well-known and widely used, is suited to the production of this integral bag unit. Low-density polyethylene is one of the extrudable plastic materials adapted for use in this process. The gusset folds along the vertical side edges thereof are formed during the extrusion process. This formation occurs when a pair of opposed, upstanding die elements apply inwardly directed pressure during the curing operation while the bag is inflated during the blown film process.

FIG. 1 illustrates one form of a bag embodying the invention which includes a front panel 10 and a back panel 11. The front and back panels 10 and 11 are integrally formed with connecting edge closure gussets 12 and 13, both having longitudinal fold lines 12a and 13a.

The top edges of the front and back panels 10 and 11 have a pair of top closure sections 14 and 15 with a top apex crease 17 which is provided with a slit opening 18 through which the hook of a garment hanger can be extended.

The material is a flexible plastic film, such as low-density polyethylene, which is sufficiently strong to prevent tearing out around the opening 18 when the hanger hook is extended therethrough with a garment hanging on the hanger. A protective garment shoulder cover 16 may be provided to overlie the shoulders of a garment on a hanger within the bag.

The bottom of the bag is provided with a pair of closure flaps 20 and 21 which extend downwardly below the main side panels 10 and 11. Fold lines 20b and 21b are formed at the lower edges of front and back panels 10 and 11 to facilitate folding of the respective flaps 20 and 21 into overlapped closure position. This tends to maintain the bottom portions of the front and back panels 10 and 11 in spaced apart noncrushing relationship. A pressure sensitive adhesive strip 22 is permanently adhesively connected by an aggressive adhesive to the outer surface of the inner flap 21 and has a releasable pressure sensitive adhesive applied to the outer surface which releasably attaches the two flaps when the flap 20 is folded into closure position across the bottom of the bag. The flaps 20 and 21 are thus releasably secured in closed position. An access notch 23 is provided in the bottom edge of each of the two gussets 12 and 13. This provides clearance for inserting one or two fingers of the operator's hand to press the underlying flap 20 against the exposed pressure sensitive adhesive surface of the adhesive strip 22 to releasably close the bottom of the bag.

An alternative form of bottom closure is illustrated in FIG. 2. In this form of the invention, front and back panels 30 and 31 are provided in the same manner as for the bag illustrated in FIG. 1. Edge closure gussets 32 and 33 are provided along the longitudinal edges of the front and back panels and are respectively provided with longitudinal fold lines. The top edges of the front and back panels 30 and 31 are provided with a pair of top closure sections 34 and 35, having a top apex crease connecting said top sections. A slit opening 36 is provided through which the hook of a garment hanger can be extended in the same manner as the first form of the invention, shown in FIG. 1. A protective shoulder cover 37 may also be provided as previously described.

The bottom portions of the front and back panels in this form of the invention are not provided with defined flaps, such as the previously described form shown in FIG. 1. In this second form of the invention shown in FIG. 2, the lower edges 30a and 31a of the front and back panels 30 and 31 are disposed in face-to-face relationship. These edges are held in closed sealed position by a strip 38 of double-sided pressure-sensitive adhesive. This strip 38 is attached to one of the strips by an aggressive permanent adhesive to maintain the same on the inner surface of one of the edges 30a or 31a. The opposite side of the strip 38 is coated with a reusable pressure-sensitive adhesive which is less aggressive than the permanent adhesive so that it may be releasably connected to the opposed surface of the opposite lower panel edge and can be readily removed therefrom by pulling the two lower edges 30a and 31a of the front and back panels 30 and 31 apart to provide access to the garments stored therein.

The lower of the edges of the side gussets 32 and 33 may be notched as indicated at 32a in FIG. 1 to facilitate access to the adhesive strip 38.

What is claimed is:

1. A clothing bag comprising
    imperforate front and back panels each having top, bottom and side edges, and extending continuously from top to bottom and from side to side,
    a single access opening formed at the bottom of the panels,
    a connecting gusset positively connecting only the top and side edges of the front and back panels to form an enclosure with a bottom access opening and provide the desired garment-receiving space between the two panels, the top having a hanger slit therein to permit the hook of a hanger to extend therethrough to support not only a garment enclosed within the bag, but also the bag itself, and
    a pair of overlapping closure flaps respectively formed at the bottom edges of the front and back panels and having mating closure surfaces with releasable pressure sensitive adhesive applied to at least one of the overlapped mating surfaces to permit closing and releasable sealing of the bottom access opening.

2. The structure set forth in claim 1 and at least one of the side gussets having an access opening formed at the bottom thereof to provide access to the inner surfaces to the closure flaps.

3. The structure set forth in claim 1 wherein the closure flaps are defined by fold lines at the bottom of the front and back panels to permit the closure flaps to be folded at substantially right angles to the front and back panels at the bottom edges of the panels for holding the lower edge portions of the front and back panels in spaced apart relation when the flaps are closed.

4. The structure set forth in claim 1 wherein the closure flaps form continuations of the lower edges of the front and back panels to form opposed inner closure flap surfaces with the releasable pressure sensitive adhesive being applied to one of said opposed flap surfaces.

* * * * *